Figure 1:
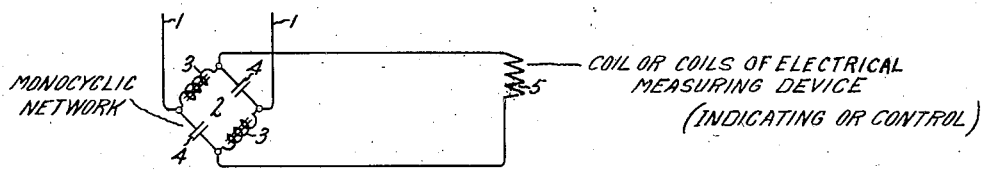

Feb. 21, 1939.　　　W. W. KUYPER　　　2,148,301

ELECTRORESPONSIVE CIRCUIT

Filed June 26, 1937

Inventor:
William W. Kuyper,
by Harry E. Dunham
His Attorney

Patented Feb. 21, 1939

2,148,301

UNITED STATES PATENT OFFICE 2,148,301

ELECTRORESPONSIVE CIRCUITS

William W. Kuyper, Marblehead, Mass., assignor to General Electric Company, a corporation of New York Application June 26, 1937, Serial No. 150,587

18 Claims. (Cl. 175—320)

My invention relates to electroresponsive circuits and more particularly to improved arrangements for energizing alternating current type voltage measuring devices.

This is a continuation-in-part of Serial No. 103,105, filed September 29, 1936 and assigned to the assignee of the present application.

By the term "voltage measuring device", I wish to be understood as including indicating voltmeters, recording voltmeters and circuit controlling voltmeters. An example of the latter is the well-known contact-making voltmeter.

Such measuring devices usually have a main coil or winding adapted to be connected in a suitable manner to respond to a voltage to be measured. As is well-known, such devices are subject to a number of different errors. First there is the usual temperature error caused by the change in resistance of the main coil, which is usually made of copper, with changes in ambient temperature. Obviously, the change in resistance alters the relation between the current in the coil and the voltage to be measured so that the accuracy of the device is impaired. Similarly, there is a well-known frequency error caused by the change in inductive reactance of the main coil with changes in frequency of the voltage to be measured. If the measuring device is provided with a movable armature or core actuated by the main winding, such for example as the solenoid core in contact-making voltmeters and in some indicating voltmeters there is still another error produced. This is caused by the change in inductive reactance of the winding resulting from different positions of the armature or core with respect to the winding.

In accordance with my invention, I substantially eliminate all of these errors by interposing between the alternating potential to be measured and the coil of the voltage-measuring device a constant potential to constant current converter or transforming means. A well-known arrangement of this type makes use of reactances of opposite sign and is known generally as a monocyclic network. Various forms of monocyclic networks are shown for example in Boucherot Patent No. 548,511 of October 22, 1895 and Steinmetz Patent No. 706,607 of August 12, 1902. Such networks have the known property that their output current is directly proportional to their input potential regardless of the impedance of the output circuit. Consequently, when the input side of such a network is connected to an alternating voltage to be measured and the output is connected to the main coil of the voltage measuring device, it will be seen that my invention eliminates all of the errors in such devices produced by changes in the impedance of the main winding of the device.

Heretofore the temperature and frequency errors have been reduced by connecting a relatively high substantially zero temperature coefficient resistor in series with the main coil of the voltage measuring device. This may be said to have diluted the over-all temperature coefficient of the voltage responsive circuit in that the change in resistance of the entire circuit as a result of changes in the resistance of the coil itself will be a relatively small percentage of the latter. Similarly, changes in current in the coil as a result of changes in coil reactance caused by changes in frequency will be relatively small because a given percentage change in coil reactance will result in a relatively small percentage change in total circuit impedance. In a typical circuit of this kind the contact-making voltmeter operates on about twelve volts and the balance of the normal 120 volts usually applied to such voltmeter circuits is consumed by the series resistor. With the above arrangement the losses in the series resistor are very high so that with two watts consumed in the voltmeter coil, fifty watts will be consumed by the series resistor. As contrasted with this, monocyclic networks can easily be made which will produce better operation than the series resistor and which will have losses of less than one watt and even as low as one quarter of a watt. The latter case represents a reduction in the losses in the voltmeter circuit of from fifty-two watts to two and one-quarter watts or more than 95%. When the losses in the usual potential transformer and line drop compensator, amounting typically to eight watts, are added the reduction in constant losses in a regulator control circuit will be from sixty watts to ten and one-quarter watts or about an 83% reduction. When the circuit is used to control an automatic induction voltage regulator, the typical no-load losses of which in popular sizes amount to about three hundred and forty watts, the reduction in constant losses of the whole regulator and its control are from four hundred watts to three hundred and fifty and a quarter watts representing a reduction of about 15%. Such reductions in losses represent a continuous day and night saving.

In addition to the above, my invention contemplates a number of other advantages. One of these relates to line drop compensation. It is sometimes desirable to have the voltage measuring device respond to the voltage at a remote point on a circuit instead of to the voltage at the point where the voltage measuring device is connected to the circuit. The difference between the voltage at these two points is usually caused by the voltage drop produced by the line current flowing through the line impedance and various devices known as line drop compensators are commonly used to compensate the voltage measuring device for this line drop. These line drop compensators are arranged to modify the energization of the voltage measuring device in accordance with the line drop. The line drop is a vector quantity having a magnitude which is proportional to the product of the line current and the line impedance and having an angular value determined by the power factor of the current and the impedance angle of the line. At any given power factor, it is therefore important that the phase relation between the quantity energizing the voltage measuring device in accordance with voltage and the quantity energizing the voltage measuring device in accordance with line drop have a fixed phase relation, which is determined by the constants of the line or circuit. Now one of the properties of a monocyclic network is that its output current is always at right angles or in quadrature with its input voltage regardless of the impedance of the output circuit. Consequently, when the voltage measuring device is energized in response to voltage through a monocyclic network, the voltage responsive current in the winding of the device bears a fixed phase relationship to the voltage of the main circuit regardless of the impedance of the winding or its circuit. Therefore, with my invention the phase of the voltage responsive current in the winding of the voltage measuring device will be independent of changes in resistance or reactance of the winding and changes in impedance of the winding will not affect the accuracy of the line drop compensation.

Another advantage of my invention arises from the fact that the power factor on the input side of a monocyclic network is equal to but of opposite sign with respect to the power factor on the output side. Consequently when an inductive winding is connected to the output side of the network, the input side will have a leading power factor or capacitive effect. Thus, the action of the circuit will correspond to the action of a shunt or power factor improving capacitor with respect to the main circuit.

My invention is not limited to voltage as the ultimate quantity to be measured and by suitable and well-known means an alternating potential may be made a function of almost any variable quantity to be measured or controlled and my monocyclic electroresponsive circuit may then be connected to measure that quantity in terms of alternating potential.

An object of my invention is to provide an improved alternating current electroresponsive circuit.

Another object of my invention is to provide a new and improved low loss alternating current voltage measuring circuit which is substantially independent of temperature, frequency and core position errors.

An additional object of my invention is to provide a line drop compensated voltage measuring system in which the phase angle of the voltage responsive quantity energizing the measuring device bears a fixed relation to the voltage of the main circuit whose voltage is to be measured.

My invention will be better understood from the following description taken in connection with the accompanying drawing and its scope will be pointed out in the appended claims.

Figure 2:
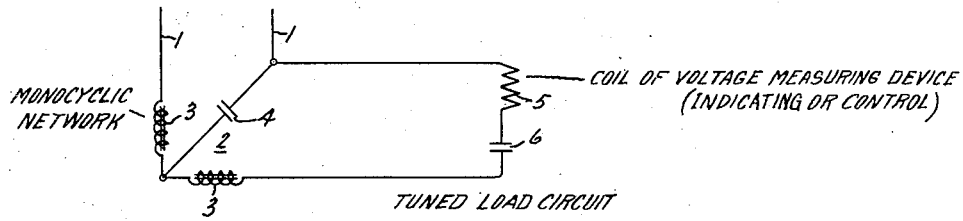
Figure 3:
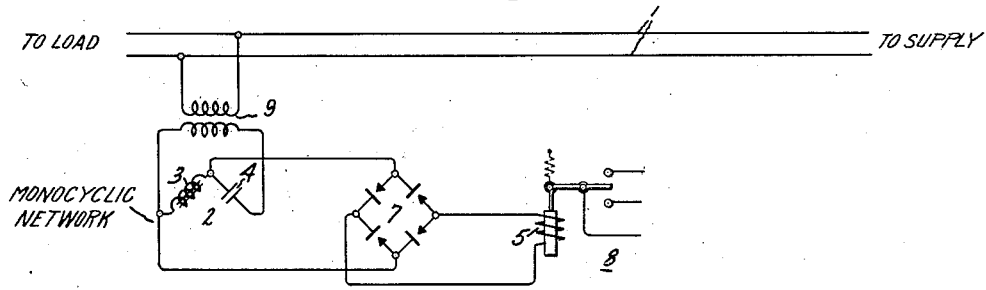
Figure 4:
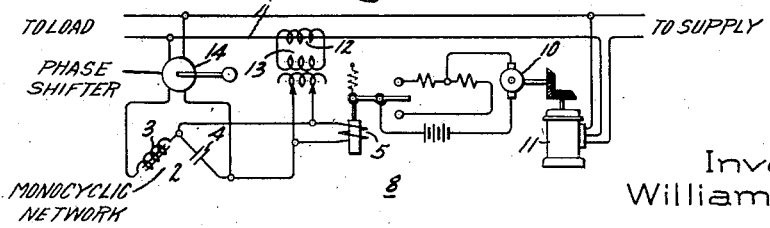

In the drawing, Fig. 1 is a diagrammatic showing of a circuit embodying a simple form of my invention; Fig. 2 is a modification including a capacitor for reducing to a minimum the volt-ampere burden of the voltage measuring circuit; Fig. 3 is another modification in which a rectifier is utilized for reducing to a minimum the volt-ampere burden of a contact-making voltmeter; and Fig. 4 illustrates diagrammatically an application of another form of my invention to an automatic line drop compensated induction voltage regulator system.

Referring now to the drawing and more particularly to Fig. 1, I have shown therein a circuit 1 adapted to be connected to any circuit or apparatus having an alternating voltage to be measured or controlled. This circuit is connected to the input terminals of a monocyclic network 2 which in the single phase form shown is often referred to as a monocyclic square in that it is made up of two inductive reactances 3 and two capacitive reactances 4 alternately connected in a loop or square. All four reactances are substantially equal at the frequency at which the circuit normally operates. The output of this square is connected to a winding 5 which may be the main coil of any voltage measuring device.

In the operation of Fig. 1, the properties of the monocyclic network 2 insure that the current in the coil 5 is proportional to the voltage between the input conductors 1 regardless of the impedance of the circuit including the winding 5. With correctly proportioned elements of the network 2, this current may be also made substantially independent of reasonable changes in the frequency of the voltage applied between the conductors 1. The phase angle relation of the voltage between the conductors 1 and the current in the coil 5 is also fixed by the network 2 and is independent of the impedance of the circuit including the winding 5. By reason of the inherently low resistance of the elements of the monocyclic network the losses in it are negligible and are much less than the losses in coil 5.

Fig. 2 differs from Fig. 1 mainly in that a capacitor 6 is connected in series with the winding 5. By properly proportioning this capacitor, the size of the elements of the monocyclic network and the volt-ampere drain on the potential source may both be made a minimum. Thus, by tuning the circuit including the series-connected inductive winding 5 and capacitor 6, the load on the monocyclic network may in effect be made substantially resistive as its reactance will be substantially zero. Consequently, the voltage necessary to force a given current through the tuned circuit will be a minimum, which means that the current in the input circuit will be a minimum and as the input voltage is fixed by the voltage of the supply circuit the volt-ampere drain on the supply circuit will be a minimum.

The monocyclic network in this figure is of a modified form consisting of two inductive elements and one capacitive element in a so-called T-connection.

Fig. 3 accomplishes substantially the same thing as Fig. 2 by means of a rectifier 7. As shown, this rectifier is a bridge-connected dry rectifier but obviously it may take any suitable form. The input terminals of the rectifier are connected to the output of the monocyclic network 2 and the output terminals of the rectifier are connected to the winding 5 of a contact-making voltmeter 8. As only direct current can flow through the winding 5, it does not have any inductive reactance effect and consequently so far as the output of the monocyclic network is concerned the load circuit on it is purely resistive. Consequently, as explained above in connection with Fig. 2 the volt-ampere burden of the circuit is a minimum.

A potential transformer 9 is interposed between the main circuit 1 whose voltage is to be measured and the input of the monocyclic network 2. This is often necessary in cases where the voltage of the circuit to be measured is too high for convenient and safe direct connection to the monocyclic network.

The monocyclic network is of a simplified form consisting of but one inductive element and one capacitive element in series across the supply, with the load being connected across the inductive element.

In Fig. 4, the contact-making voltmeter 8 is connected to control the direction of operation of a conventional servo motor 10 for driving an induction voltage regulator 11 for regulating the voltage in circuit 1. Line drop compensating means of the form disclosed and claimed in an application of Franklin J. Champlin, Serial No. 46,321, filed October 23, 1935 and assigned to the assignee of the present application is applied to the contact-making voltmeter 8. This line drop compensating means consists of two main parts. The first is for introducing an energizing component for the contact-making voltmeter 8 which varies in accordance with the magnitude of the line drop in circuit 1. This means is shown as comprising a current transformer 12 and a manually adjustable ratio transformer 13, the output of which is connected across the winding 5. By properly adjusting the ratio of transformer 13, an auxiliary current may be circulated in winding 5 which is proportional to the magnitude of the line drop in the circuit 1 between any two points thereon. The second part of the line drop compensating means consists of apparatus for selectively adjusting the phase relation of the quantities, respectively to the voltage and current of the circuit 1, which energize the contact-making voltmeter 8. This means is shown as a phase shifter 14 which may be of any suitable type, such for example as a rotary transformer having a split phase primary winding.

By properly setting the phase shifter 14, correction can be made for various ratios of resistance to reactance of the circuit 1 and the phase relation between the voltage responsive current in the winding 5 and the line current responsive current in the winding 5 may be made the same as the phase relation between the voltage of the circuit 1 and the line drop in this circuit.

The monocyclic network differs from that of Fig. 3 in that the load is connected across the capacitive element 4. Such two element networks are less expensive than the more complicated types shown in Figs. 1 and 2.

By reason of the property of the monocyclic network 2 of maintaining a fixed phase relation between its output current and its input voltage, the setting of the line drop compensating elements is unaffected by reasonable variations in temperature, frequency and core position of the solenoid of the contact-making voltmeter 8.

The operation of the regulating system of Fig. 4 is such that whenever the voltage at the load center, or other point for which the line drop compensator is set, departs from a predetermined normal value, the contact making voltmeter 8 will make contact with one or the other of its two fixed contacts, thereby causing the motor 10 to drive the regulator 11 in such a direction as to restore the voltage to normal. As soon as the voltage is restored to normal the contact making voltmeter will again balance and the regulator will come to rest.

While I have shown and described particular embodiments of my invention it will be obvious to those skilled in the art that changes and modifications can be made and I therefore aim in the appended claims to cover all such changes and modifications as fall within the true spirit and scope of my invention.

What I claim as new and desire to secure by Letters Patent of the United States is:—

1. In combination, an alternating current circuit an electrical condition of which is to be measured, an electrical measuring device which is responsive to normal variations in said condition, and a constant-potential constant-current converter interposed between said circuit and said device.

2. In combination, a conventional alternating current load circuit the voltage of which is to be measured, a voltage measuring device which is responsive to normal variations in said voltage, and means for converting any given input potential to a corresponding output current interposed between said load circuit and said device.

3. In combination, an alternating current circuit the voltage of which is to be measured, a voltage measuring device which is responsive to normal variations in said voltage, and a monocyclic network interposed between said circuit and said device.

4. In combination, an alternating current circuit, an electrical measuring device which is responsive to normal variations in an electrical condition of said circuit, and means for energizing said device with an alternating current whose phase angle with respect to the voltage of said circuit is independent of the impedance of said device.

5. In combination, an alternating current circuit, a coil of a voltage measuring control device which is responsive to normal variations in an electrical condition of said circuit, and means for energizing said coil with a current derived from said circuit which is proportional to the voltage of said circuit and which has a phase relation with respect to the voltage of said circuit which is independent of the impedance of said coil.

6. In combination, an alternating current circuit, an electrical measuring device, a constant-potential constant-current converting means interposed between said circuit and said measuring device, and means for reducing to a minimum the volt-ampere burden of said measuring device on said converting means.

7. In combination, an alternating current circuit, an electrical measuring device having an inductive winding, a constant-potential constant-current converting means interposed between said circuit and said winding, and a series capacitor interposed between said converting means and said winding, said capacitor being so proportioned as to reduce to a substantial minimum the volt-ampere burden of said winding on said converting means.

8. In combination, an alternating current circuit an electrical condition of which is to be measured, an electrical measuring device having an inductive winding, a constant-potential constant-current converting means interposed between said circuit and said winding, and a rectifier interposed between said converting means and said winding.

9. In combination, a main variable voltage alternating current power circuit, a control circuit connected in shunt to said main circuit and containing an electroresponsive device of the type adapted to control any suitable voltage regulating means for said circuit, and a constant-potential constant-current transforming arrangement connected in said shunt control circuit between said main circuit and said device.

10. In combination, a variable voltage alternating current circuit, an electroresponsive device of the type adapted to control any suitable voltage regulating means for said circuit, a constant-potential constant-current converter having input terminals connected to respond to the voltage of said circuit and having output terminals connected to supply current to said device, and means for reducing to a minimum the volt-ampere burden of said device on said converter.

11. In combination, a single phase variable voltage alternating current circuit, a contact-making voltmeter, a monocyclic network, and a bridge connected dry rectifier, the input terminals of said monocyclic network being connected to respond to the voltage of said circuit, the output terminals of said monocyclic network being connected to the input terminals of said rectifier, and the output terminals of said rectifier being connected to energize said contact-making voltmeter.

12. In combination, an alternating current circuit, a voltage-measuring device, a monocyclic network interposed between said device and said circuit, and line drop compensating means for modifying the energization of said device in accordance with the line drop in said circuit.

13. In combination, a variable voltage alternating current circuit, a contact-making voltmeter, means for energizing said voltmeter with a current derived from said circuit whose magnitude and phase bears a relation to the magnitude and phase of the voltage of said circuit which is independent of the impedance of the operating winding of said voltmeter, and line drop compensating means for modifying the energization of said contact-making voltmeter in accordance with the line drop in said circuit.

14. In combination, an alternating current circuit the voltage of which is to be measured, an electroresponsive device for measuring normal variations in said voltage, and a monocyclic network interposed between said circuit and said device, said network comprising an inductance element and a capacitance element connected in series across said alternating current circuit, said electroresponsive device being connected across one of said elements.

15. A voltage measuring system adapted for use with an automatic voltage regulator for an alternating current circuit comprising, in combination, a voltage regulator control relay responsive to normal variations in the voltage of said circuit, and a constant-potential to constant-current converter interposed between said circuit and said relay, said converter comprising an inductance element and a capacitance element connected in series across said circuit, said relay being connected across said capacitance element.

16. In combination, an alternating current power circuit, a voltmeter circuit including a voltmeter coil having substantial inductance and having an appreciable temperature coefficient of resistance connected to measure normal variations in the voltage of said power circuit, and reactive means having relatively very small inherent resistance connected in said voltmeter circuit for substantially eliminating errors produced by said voltmeter coil as a result of changes in temperature of said coil and as a result of changes in frequency of said power circuit.

17. In combination, an alternating current power circuit, a voltmeter circuit connected to respond to normal variations in the voltage of said power circuit, said voltmeter circuit containing a copper voltmeter coil, and means consisting entirely of reactance elements connected in said voltmeter circuit for substantially eliminating temperature and frequency errors therein, the watt loss in said reactance element being less than the watt loss in said voltmeter coil.

18. In combination, means having a variable quantity to be measured, apparatus for deriving therefrom an alternating potential which is a function of said quantity, and a compensated low loss measuring circuit adapted to be energized by said potential, said measuring circuit containing a monocyclic network energized by said apparatus, and an electroresponsive measuring device connected to be energized by said monocyclic network so as to be responsive to normal variations in said potential.

WILLIAM W. KUYPER.